United States Patent [19]

Stahl et al.

[11] Patent Number: 6,148,663

[45] Date of Patent: *Nov. 21, 2000

[54] DEVICE FOR MEASURING THE AMOUNT OF A FLOWING MEDIUM

[75] Inventors: Axel Stahl, Leonberg; Wolfgang Mueller, Rutesheim; Uwe Konzelmann, Asperg, all of Germany

[73] Assignee: Robert Bosch GmbH, Stuttgart, Germany

[ * ] Notice: This patent is subject to a terminal disclaimer.

[21] Appl. No.: 09/011,527

[22] PCT Filed: Jan. 10, 1997

[86] PCT No.: PCT/DE97/00044

§ 371 Date: Feb. 12, 1998

§ 102(e) Date: Feb. 12, 1998

[87] PCT Pub. No.: WO97/47952

PCT Pub. Date: Dec. 18, 1997

[30] Foreign Application Priority Data

Jun. 12, 1996 [DE] Germany .............................. 196 23 334

[51] Int. Cl.[7] ...................................................... G01F 1/68
[52] U.S. Cl. ........................... 73/118.2; 73/202; 73/202.5

[58] Field of Search .................................... 73/118.2, 202, 73/202.5, 204.22

[56] References Cited

U.S. PATENT DOCUMENTS 5,355,726  10/1994  Zurek et al. ........................... 73/202.5
5,696,321  12/1997  Igarashi et al. ........................ 73/202.5

*Primary Examiner*—Harshad Patel
*Attorney, Agent, or Firm*—Ronald E. Greigg; Edwin E. Greigg

[57] ABSTRACT

A device for measuring the mass of a flowing medium, with a temperature-dependent measurement element that substantially reduces measurement errors due to a pulsating flow that is characterized by means of flow fluctuations. The device has a measurement conduit which extends from an inlet to an outlet that is adjoined by a first section piece of a deflection conduit. The medium flows from the outlet to the first section piece and is deflected by an edge face into a second section piece of the deflection conduit. The edge face of the first section piece of the deflection conduit is embodied as inclined in relation to the flow direction in the measurement conduit. The invention is provided for measuring the mass of a flowing medium, for the intake air mass of internal combustion engines.

15 Claims, 2 Drawing Sheets

DEVICE FOR MEASURING THE AMOUNT OF A FLOWING MEDIUM

PRIOR ART

The invention is based on a device for measuring the mass of a flowing medium. DE-OS 44 07 209 has already disclosed a device that has a temperature-dependent measurement element that is accommodated in a measurement conduit. The measurement conduit extends in the device from an inlet to an outlet which is adjoined by an S-shaped deflection conduit. The deflection conduit is composed of a first section piece and a second section piece. The first section piece has a right-angled bend and transitions into the second section piece at an edge face. The flowing medium first flows from the outlet of the measurement conduit into the first section piece of the deflection conduit, which has a greater flow cross section than the measurement conduit, so that there is an abrupt flow transition in the form of a step in relation to the first section piece. Then the medium, having been deflected by the first section piece, travels from the corner along the edge face of the first section piece into the laterally adjoining second section piece of the deflection conduit and exits from this out of an outlet opening in order to mix once again with the medium flowing past the device.

In an internal combustion engine, the opening and closing of the inlet valves of the individual cylinders produce considerable fluctuations or pulsations of the flow, whose intensity is a function of the intake frequency of the individual pistons or is a function of the speed of the engine. The pulsations of the flow propagate from the inlet valves via the intake line, to the measurement element in the measurement conduit, and beyond. The pulsations result in the fact that depending on the intensity of the pulsations, due to a thermal inertia and directional insensitivity of the measurement element, it produces a measurement result that can deviate considerably from the flow speed prevailing in the center of the measurement conduit and the intake air mass of the engine that can be calculated from it. The measurement conduit and the deflection conduit are matched to each other in their dimensions in such a way that with a pulsating flow in the intake line, the false indication of the measurement element that occurs due to the flow fluctuations is minimal. Nevertheless, at high pulsation frequencies and significant pulsation amplitudes, due to flow-acoustic processes in the deflection conduit, a false indication of the intake air mass can occur. In particular, this false indication is produced by virtue of the fact that with a pulsating flow downstream of the measurement element at the step between the outlet of the measurement conduit and the corner on the first section piece of the deflection conduit, a pressure wave can be produced which is reflected at the edge face of the deflection conduit at the bend so that the measurement signal of the measurement element experiences interference due to a feedback effect.

ADVANTAGES OF THE INVENTION

The device according to the invention for measuring the mass of a flowing medium, has the advantage over the prior art that a uniformly precise measurement result can be achieved virtually independent of a fluctuating or pulsating flow. This is advantageously possible without in the process having to change the distance between the edge face of the first section piece of the deflection conduit to the outlet of the measurement conduit so that the modulation of the overall conduit comprised of the measurement conduit and the deflection conduit is not impaired, by means of which a compact construction of the device can be maintained.

A flow connection provided in the deflection conduit is for external flow and is disposed in the intake line in the form of an opening, by means of which a residual interference of the pressure wave in the deflection conduit, which could still exist, can be completely eliminated, thus producing a further improvement of the measurement result. Furthermore, the device has markedly reduced measurement signal noise, which can be generated by turbulences that occur in the measurement conduit.

BRIEF DESCRIPTION OF THE DRAWINGS

Exemplary embodiments of the invention are shown in simplified form in the drawings and explained in detail in the description below.

DESCRIPTION OF THE EXEMPLARY EMBODIMENTS

Figure 1:
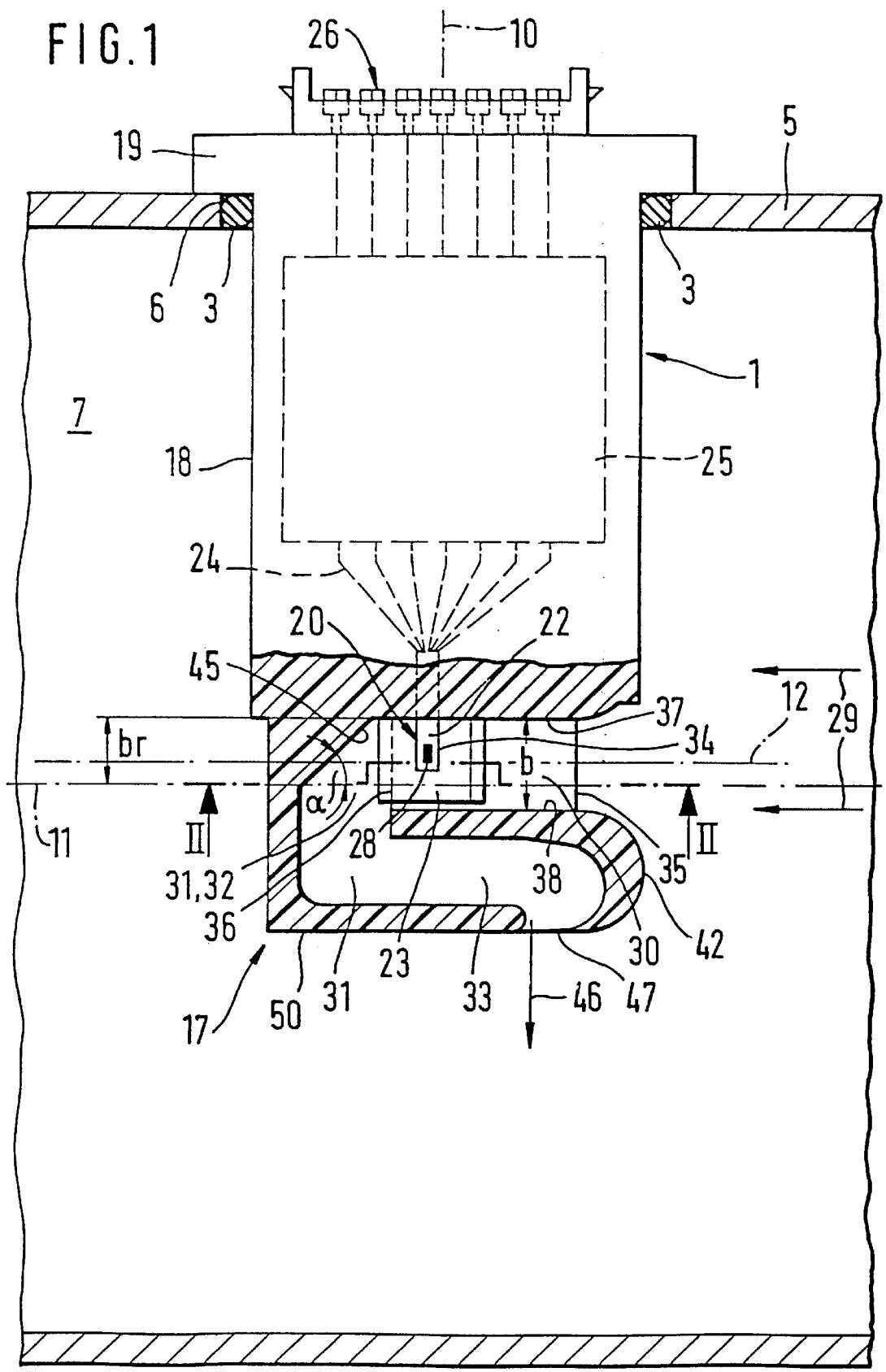
FIG. 1 shows a partial sectional side view of a device, according to a first exemplary embodiment according to the invention.

FIG. 1 shows a partial sectional side view of a device indicated with 1, which is used for measuring the mass of a flowing medium, in particular the intake mass of internal combustion engines. The device 1 preferably has a slim, block-shaped form that extends radially elongated in the direction of a longitudinal axis 10 and is inserted, for example so that it can slide into an opening 6 of an intake line 7, which opening is recessed into a wall 5. The device 1 is sealed by means of a sealing ring 3 in the wall 5 and is connected to the wall, for example, by means of a screw connection not shown in detail. The crosshatched wall 5 is part of the for example cylindrically embodied intake line 7 through which the engine can take in air from the environment via an air filter not shown in detail. The wall 5 of the intake line 7 adjoins a flow cross section which in the case of the cylindrical intake line 7, has an approximately circular cross section, at whose center, a center axis 11 extends in the axial direction parallel to the wall 5 and is oriented perpendicular to the longitudinal axis 10. The device 1 protrudes with a part referred to below as the measurement part 17 into the flow medium, wherein the measurement part 17 extends, for example, to above the center of the intake line 7 and is symmetrically divided by a plane through the center axis 11, which is disposed in the plane of the drawing, so that a temperature-dependent measurement element 20 that is accommodated in the measurement part 17 can be flowed against to as great an extent as possible without interfering edge influences of the wall 5. In the exemplary embodiments according to FIGS. 1 to 3, the medium flows from right to left, wherein corresponding arrows 29 indicate the flow direction.

Figure 3:
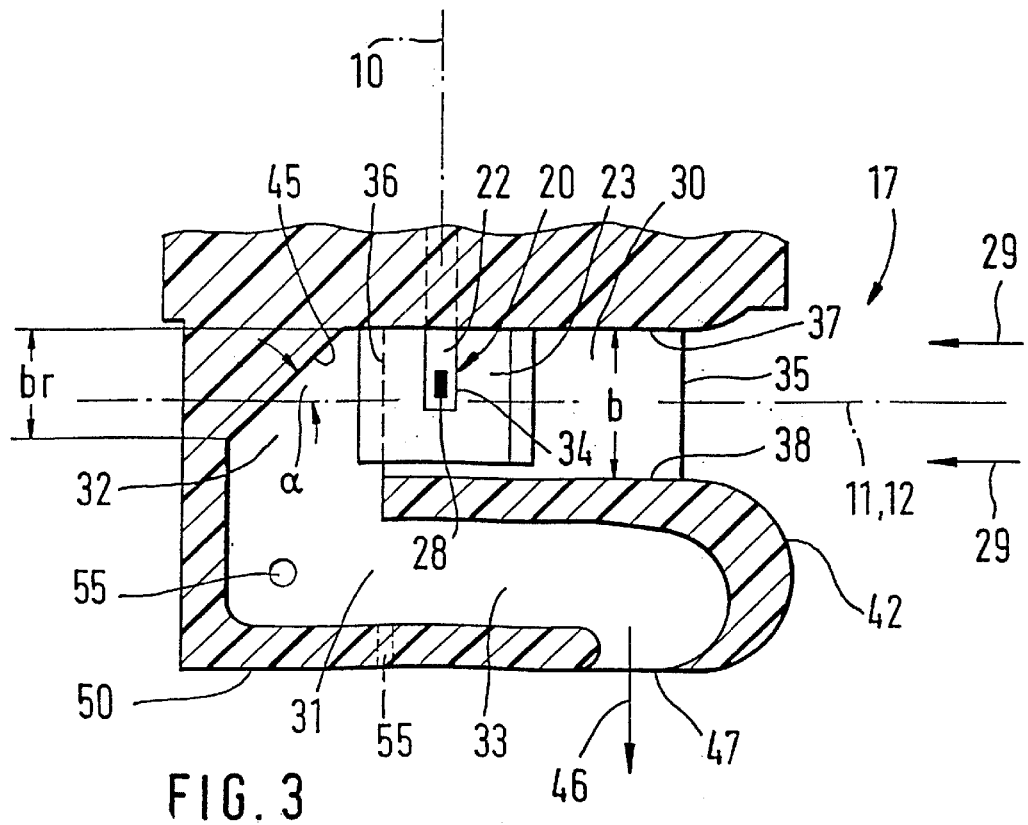
FIG. 3 shows a sectional view of the device embodied, according to a second exemplary embodiment according to the invention.

The device 1 is composed of one piece including the measurement part 17, a supporting part 18, and a securing part 19, and is produced, for example, out of plastic using injection molded plastic technology. The measurement element 20 is embodied, for example, as plate-shaped and, as can be inferred, for example, from DE-OS 36 38 138, has one or more temperature-dependent resistors 28 which, in the form of resistive films so-called hot-film resistors, are mounted on a plate-shaped ceramic substrate that is used as a supporting body 22. However, as shown in FIGS. 1 and 3 and as can be inferred from the prior art, for example from DE-OS 43 38 891, it is also possible to embody the measurement element 20 in the form of a so-called micromechanical component. The measurement element 20 has a supporting body 22 with a membrane-shaped sensor region produced by means of etching, with an extremely low thickness and a number of resistive films likewise produced by etching, which constitute at least one temperature-dependent measurement resistor 28 and for example one heating resistor. The measurement element 20 is therefore comprised of at least one plate-shaped carrying body 22, e.g. comprised of ceramic, and at least one temperature-dependent resistor 28. The carrying body 22 is accommodated flush in a recess 34 in a container 23, e.g. comprised of metal and is secured there, for example, by means of glue. Oriented toward the flow 29, the container 23 has a leading edge that is preferably embodied as beveled. By means of connection lines 24 that extend on the inside of the device 1, the individual resistive layers 28 of the measurement element 20 are electrically connected to an electronic evaluation circuit 25, which is represented with dashed lines in FIG. 1 and contains, for example, a bridge-like resistive measurement circuit. The evaluation circuit 25 is accommodated, for example, in the supporting part 18 or in the securing part 19 of the device 1. If the evaluation circuit 25 is accommodated, for example, in the supporting part 18, then it is possible to cool the circuit, for example, by means of a cooling body and the medium flowing in the intake line 7. With a plug connection 26 provided on the securing part 19, the electrical signals generated by the evaluation circuit 25 can, for example, also be supplied to a further electronic control device for evaluation. A detailed description of the function and construction of temperature-dependent measurement elements is not necessary since this can be inferred by one skilled in the prior art.

Figure 2:
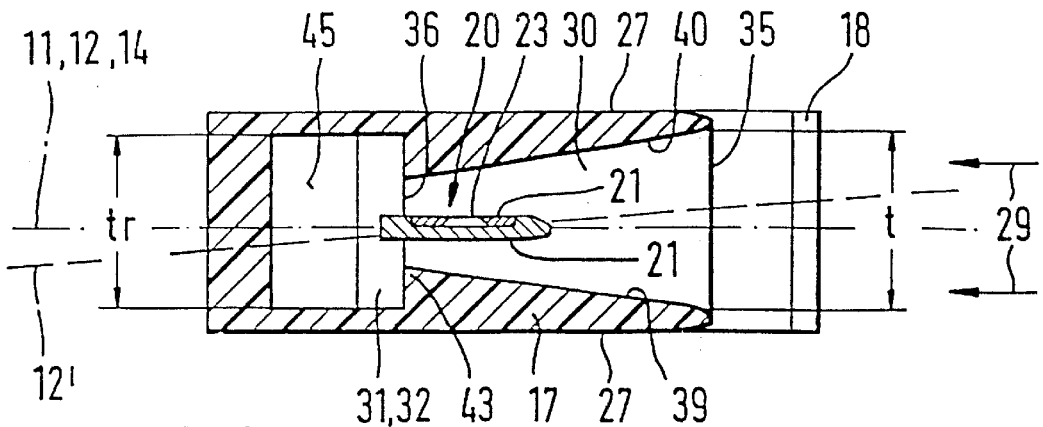
FIG. 2 shows a section along line II—II in FIG. 1.

As shown in FIG. 2, which is a sectional representation along a line II—II in FIG. 1, the measurement part 17 of the device 1 has a block-shaped form and has a measurement conduit 30 that extends along a measurement conduit axis 12 that runs through the center of the measurement conduit 30, from an inlet 35, which for example has a rectangular cross section, to an outlet 36, which for example likewise has a rectangular cross section. The device 1 is installed in the intake line 7, preferably with the measurement conduit axis 12 parallel to the center axis 11. However as shown in FIG. 2 by means of the measurement conduit axis 12' indicated with dashed lines, it is also possible to install the device 1 with a rotated installation position so that the measurement conduit axis 12' can enclose an angle of a few degrees with the center axis 11. As shown in FIG. 1, the measurement conduit 30 transitions into an S-shaped deflection conduit 31. The measurement conduit 30 is defined by a top face 37 farther from the center axis 11 and a bottom face 38 closer to the center axis 11, as well as two side faces 39, 40 shown in FIG. 2. In the exemplary embodiment according to FIG. 1, the measurement conduit 30 is disposed with its measurement conduit axis 12 for example eccentric to the center axis 11. However as shown in FIG. 3, a second exemplary embodiment of the device 1 according to the invention, it is also possible to dispose the measurement conduit 30 with its measurement conduit axis 12 central to or in the region of the center axis 11 of the intake line 7. The container for the plate-shaped measurement element 20 is secured on one side in the supporting part 18 against the top face 37 so that with the measurement element 20 on its two side faces 21 that extend approximately parallel to the measurement conduit axis 12, the container 23 is circulated around by a medium.

As shown in FIG. 2, the side faces 39, 40 of the measurement conduit 30 extend diagonal to a plane 14 that contains the measurement conduit axis 12 and the longitudinal axis 10 and with this plane, enclose an acute angle so that viewed in the flow direction 29, the measurement conduit 30 tapers axially in order to feed with its smallest cross section at the outlet 36 into a first section piece 32 of the deflection conduit 31. The measurement element 20 is disposed in the container 23, upstream of the narrowest point of the measurement conduit 30 or upstream of the outlet 36 in the measurement conduit 30. The tapering of the measurement conduit 30 provided in the flow direction 29 brings about the fact that in the region of the measurement element 20, a uniform parallel flow can prevail that is as free from interference as possible. In order to prevent burbling in the region of the inlet 35 of the measurement conduit 30, the inlet region of the measurement conduit 30 has a rounded edge surface 42, which is shown in FIG. 1.

According to the invention, an edge face 45 of the first section piece 32 of the deflection conduit 31, which edge face is disposed in the projection of the outlet 36 in the flow direction 29 on the opposing wall of the deflection conduit 31, is not embodied as perpendicular to the flow 29, but is inclined in relation to it so that an inclination angle α enclosed by the measurement conduit axis 12 and the edge face 45 is preferably approximately 45 degrees. However, it is also possible to embody the edge face 45 with an inclination angle α that is in the range of approximately 30 to 60 degrees. As shown in FIG. 1, downstream of the edge face 45, a second section piece 33 of the deflection conduit 31 adjoins the first section piece 32 lateral to it or lateral to the direction of the longitudinal axis 10. The inclined edge face 45 is provided in order to divert the medium flowing from the outlet 36 of the measurement conduit 30 into the first section piece 32 along the edge face 45 into the second section piece 33. The edge face 45 extends approximately to the cutting line II—II or to the center axis 11 in FIG. 1. In the direction of the longitudinal axis 10, the edge face 45 has a width br that is slightly smaller than the width b of the measurement conduit 30 in the direction of the longitudinal axis 10. However, it is also possible to embody the edge face 45 with a width br that corresponds to the width b of the measurement conduit 30. The width br of the edge face 45, though, should be at least ⅔ the width b of the measurement conduit 30. As shown in FIG. 2, perpendicular to the width br, the edge face 45 has a depth tr that preferably corresponds approximately to the depth t of the measurement conduit 30 perpendicular to its width b at the inlet 35. However, it is also possible to embody the edge face 45 with a depth tr that is slightly less than the depth t of the inlet 35 of the measurement conduit 30. Adjacent to the edge face 45, the wall of the first section piece 32 extends approximately in the direction of the longitudinal axis 10.

The deflection conduit 31 composed of the first section piece 32 and the second section piece 33 preferably has a rectangular cross section, which approximately corresponds to the cross sectional area of the inlet 35 of the measurement conduit 30 so that, the flow cross section abruptly increases at a step 43 at the outlet 36 between the measurement conduit 30 and the deflection conduit 31. Downstream of the outlet 36, the medium flowing in the measurement conduit 30 first travels into the first section piece 32, is deflected against the edge face 45, and flows from this on into the second section piece 33. As shown by an arrow 46 drawn in FIGS. 1 and 3, the medium then leaves the second section piece 33 via an outlet opening 47 and arrives in the intake line 7 essentially lateral to the flow direction 29. Like the deflection conduit 31, the outlet opening 47 has, for example, a rectangular cross section and is provided on a lower external face 50 of the measurement part 17 oriented parallel to the measurement conduit axis 12. As shown in FIGS. 1 and 3, the edge surface 42 of the measurement part 17 that opposes the flow 29 adjoins to the right of the rectangular outlet opening 47, lateral to the lower external face 50 and upstream of the inlet 35 of the measurement conduit 30, this edge surface leads in a rounded form from the lower external face 50 to the bottom face 38 of the measurement conduit 30 until reaching the inlet 35.

The inclined embodiment of the edge face 45 in the deflection conduit 31 brings about the fact that interferences in the flow arising from the outlet 36 of the measurement conduit 30, which can occur, for example, in the form of whirls or in the form of pressure waves, are reflected against the edge face 45. Depending on the point of origin of the whirls or the pressure waves over the width of the step 43 or the outlet 36 extending in the direction of the longitudinal axis 10, a different distance is produced in relation to the edge face 45 so that the individual whirls or pressure waves produced along the width are reflected against the edge face 45 in a time-delayed fashion with the result that they are additionally deflected in their direction and are on the whole weakened in their interfering action on the measurement element 20. As a result of this time and location-dependent reflection of interferences against the edge face 45, an influence on the electrical signal emitted by the measurement element 20 can be prevented. This results in the fact that a false indication of the measurement element 20 that would otherwise occur in the event of a pulsating flow can be sharply reduced or even prevented.

In FIG. 3, a second exemplary embodiment according to the invention, in which all the same parts or those with equivalent functions are indicated with the same reference numerals from FIGS. 1 and 2, an opening 55 in the deflection conduit 31 is shown downstream of the edge face 45, which opening, for example in the form of a bore, produces a connection of the flow in the deflection conduit 31 to the external flow in the intake line 7. The opening 55 is embodied, for example, as a circular bore that extends from one of the side walls 27 of the measurement part 17 over the intersecting region from the first section piece 32 into the second section piece 33 of the deflection conduit 31. However as shown with dashed lines in FIG. 3, it is also possible to provide the opening 55 extending starting from the lower external face 50 of the measurement part 17 to the second section piece 33. The opening 55 has a relatively small cross section and has an opening diameter of a few millimeters, for example 2 mm. Naturally, there can also be a number of openings 55. By means of the at least one opening 55, the resonance chamber that is formed by the deflection conduit 31 and is for the pressure waves exiting downstream of the outlet 36 of the measurement conduit 30 can be influenced in such a way that due to a pressure compensation brings about a weakening in the pressure waves reflected against the edge face 45. Through the size of the cross section of the at least one opening 55, the natural frequency of the resonance chamber can be tuned to the frequency of the outgoing pressure waves in such a way that it produces a further improvement of the measurement result delivered by the measurement element 20.

Furthermore, the at least one opening 55 allows for the possibility that due to the pressure compensation of the flow in the deflection conduit 31 in relation to the flow in the intake line 7, pressure waves in the deflection conduit 31, which are possibly weakened further, can escape into the intake line 7 without disadvantageously influencing the measurement result delivered by the measurement element 20 in the process.

The foregoing relates to preferred exemplary embodiments of the invention, it being understood that other variants and embodiments thereof are possible within the spirit and scope of the invention, the latter being defined by the appended claims.

We claim:

1. A device for measuring the mass of a flowing medium in the intake air of internal combustion engines, comprising a temperature-dependent measurement element around which the flowing medium is circulated and which is disposed in a measurement conduit that extends in the device, said conduit extends from an inlet to an outlet that is adjoined by a first section piece of a deflection conduit, into which the medium flows from the outlet and is deflected by an edge face of the first section piece into a second section piece of the deflection conduit, the edge face (45) of the first section piece (32) of the deflection conduit (31) is disposed in a projection of the outlet (36) in the flow direction (29) on an opposite wall of the first section piece (32) and is embodied inclined in relation to the flow direction (29) in the measurement conduit (30), and in the flow direction (29) a second section piece (33) adjoins the first section piece (32) of the deflection conduit (31) and at least one opening (55) is provided in the first section piece (32), in which said opening produces a connection to a medium that circulates around the device (1).

2. A device according to claim 1, in which the edge face (45) has a depth tr and a width br extending perpendicular to said depth tr that approximately corresponds to the width b of the inlet (35) of the measurement conduit (30).

3. A device according to claim 2, in which an inclination angle α enclosed by the edge face (45) and the flow direction (29) in the measurement conduit (30) is in a range of approximately 30 to 60 degrees.

4. A device according to claim 3, in which the inclination angle α is approximately 45 degrees.

5. A device according to claim 1, in which an inclination angle α enclosed by the edge face (45) and the flow direction (29) in the measurement conduit (30) is in a range of approximately 30 to 60 degrees.

6. A device according to claim 3, in which the inclination angle α is approximately 45 degrees.

7. A device according to claim 1, in which the width br of the edge face (45) is at least ⅔ the width b of the measurement conduit (30).

8. A device according to claim 1, in which the edge face (45) has a width br and a depth tr extending perpendicular to the width br and the depth tr of the edge face (45) approximately corresponds to the depth t of the measurement conduit (30) at the inlet (35).

9. A device according to claim 1, in which the at least one opening (55) leads to side walls (27) and a lower external face (50) of a measurement part (17) of the device (1), which measurement part contains the measurement conduit (30).

10. A device according to claim 1, in which the measurement conduit (30) has a rectangular cross section that tapers from the inlet (35) to the outlet (36).

11. A device according to claim 1, in which the deflection conduit (31) has a rectangular cross section, wherein the first section piece (32) is embodied in such a way that the flow cross section increases abruptly downstream of the outlet (36) of the measurement conduit (30).

12. A device according to claim 1, in which the at least one opening (55) leads to side walls (27) or a lower external face (50) of a measurement part (17) of the device (1), which measurement part contains the measurement conduit (30).

13. A device for measuring the mass of a flowing medium in the intake air of internal combustion engines, comprising a temperature-dependent measurement element around which the flowing medium is circulated and which is disposed in a measurement conduit that extends in the device, said conduit extends from an inlet to an outlet that is adjoined by a first section piece of a deflection conduit, into which the medium flows from the outlet and is deflected by an edge face of the first section piece into a second section piece of the deflection conduit, the edge face (45) of the first section piece (32) of the deflection conduit (31) is disposed in a projection of the outlet (36) in the flow direction (29) on an opposite wall of the first section piece (32) and is embodied inclined in relation to the flow direction (29) in the measurement conduit (30), and in the flow direction (29) a second section piece (33) adjoins the first section piece (32) of the deflection conduit (31) and at least one opening (55) is provided in the second section piece (33), which opening produces a connection to a medium that circulates around the device (1).

14. A device according to claim 13, in which the at least one opening (55) leads to side walls (27) and a lower external face (50) of a measurement part (17) of the device (1), which measurement part contains the measurement conduit (30).

15. A device according to claim 13, in which the at least one opening (55) leads to side walls (27) or a lower external face (50) of a measurement part (17) of the device (1), which measurement part contains the measurement conduit (30).

* * * * *